(12) United States Patent
Mayers

(10) Patent No.: US 10,501,023 B1
(45) Date of Patent: Dec. 10, 2019

(54) VEHICLE BICYCLE RACK

(71) Applicant: Jack D. Mayers, Damascus, PA (US)

(72) Inventor: Jack D. Mayers, Damascus, PA (US)

( * ) Notice: Subject to any disclaimer, the term of this patent is extended or adjusted under 35 U.S.C. 154(b) by 7 days.

(21) Appl. No.: 15/914,730

(22) Filed: Mar. 7, 2018

Related U.S. Application Data

(63) Continuation-in-part of application No. 15/211,591, filed on Jul. 15, 2016, now abandoned.

(51) Int. Cl.
| | |
|---|---|
| *B60R 9/00* | (2006.01) |
| *B60R 9/10* | (2006.01) |
| *B60R 9/06* | (2006.01) |
| *B60R 11/00* | (2006.01) |
| *B62H 3/08* | (2006.01) |

(52) U.S. Cl.
CPC ............ *B60R 9/10* (2013.01); *B60R 9/06* (2013.01); *B60R 2011/0061* (2013.01); *B60R 2011/0071* (2013.01); *B62H 3/08* (2013.01)

(58) Field of Classification Search
CPC ..... B60R 9/06; B60R 9/10; B60R 2011/0061; B60R 2011/0071; B62H 3/08
USPC .......................................................... 224/521
See application file for complete search history.

(56) References Cited

U.S. PATENT DOCUMENTS

| | | | |
|---|---|---|---|
| 5,067,641 A | 11/1991 | Johnson et al. | |
| D325,553 S * | 4/1992 | Weiner ..................... | D12/408 |
| D341,348 S * | 11/1993 | Williams .................. | D12/408 |
| 5,337,932 A | 8/1994 | Griewahn | |
| 5,560,666 A | 10/1996 | Vieira et al. | |
| 5,649,656 A | 7/1997 | Davy | |
| 6,019,266 A * | 2/2000 | Johnson .................... | B60R 9/06 224/508 |
| 6,237,824 B1 | 5/2001 | Bagley | |
| 6,460,745 B1 * | 10/2002 | Weaver ..................... | B60R 9/06 211/17 |
| 7,243,966 B1 | 7/2007 | Sheldon | |
| 7,565,990 B2 | 7/2009 | Bryan, IV | |
| 8,556,144 B2 | 10/2013 | Liu | |
| 8,931,671 B2 * | 1/2015 | Olsen ........................ | B60R 9/10 224/519 |
| D757,612 S * | 5/2016 | Woller ...................... | D12/106 |
| D784,245 S * | 4/2017 | Mayers ..................... | D12/115 |
| 2005/0092800 A1 | 5/2005 | Wilson | |
| 2005/0224665 A1 | 10/2005 | Cassavar et al. | |
| 2010/0096424 A1 * | 4/2010 | Kuschmeader ........... | B60R 9/06 224/509 |
| 2012/0098235 A1 * | 4/2012 | DeMers .................... | B60R 9/042 280/504 |
| 2014/0027484 A1 * | 1/2014 | Loken ....................... | B60R 9/10 224/497 |

* cited by examiner

*Primary Examiner* — Peter N Helvey
(74) *Attorney, Agent, or Firm* — Cramer Patent & Design, PLLC; Aaron R. Cramer

(57) ABSTRACT

A bicycle rack for attaching to a vehicle includes a hitch attachment, a vertical support frame, and a pair of horizontal support frames. An upper horizontal support frame is perpendicularly secured to a distal end of the vertical support frame. A lower horizontal support frame is perpendicularly secured adjacent to the middle of the vertical support frame. The hitch attachment is pivotally secured behind the base of the vertical support frame and is provided with a plurality of hitch attachment apertures to allow an adjustable projection from the vehicle. The vertical support frame can be selectively moved toward horizontal by removing a lock pin. The upper and lower support frames support at least one (1) bicycle thereon.

13 Claims, 4 Drawing Sheets

VEHICLE BICYCLE RACK

RELATED APPLICATIONS

This application is a continuation in part of and claims the benefit of U.S. Utility application Ser. No. 15/211,591, which was filed Jul. 15, 2016, the entire disclosures of which are incorporated herein by reference.

FIELD OF THE INVENTION

The presently disclosed subject matter is directed to bicycle racks. More particularly, the present invention relates to vehicle bicycle racks.

BACKGROUND OF THE INVENTION

Many people enjoy bicycle riding. It is a fun, healthy activity which can be done with friends and family, with a pet, with members of a bike club or simply by yourself From the very young to the very old bicycling provides health, entertainment, fun and a unique means to get from point A to point B (and back).

While bicycling has proven to be beneficial over many generations major problems with bicycles remain such as the need to store, protect, and transport the bicycle or bicycles. Over the years a large numbers of different bicycle racks that cover multiple needs at various expenses have been developed. For home use a fixed bike rack attached to a building can be used to store and secure one or more bicycles. Some businesses provide bike racks for employees and customers while many cities implement a system of bike racks for riders to secure their bicycles to using locks, chains and cables.

However, at times a mobile bike rack is needed. Some city bus systems implement external bike racks on their buses. But more often a rider wants to transport a bicycle by mounting it on his or her automobile or truck. To that end there is a wide selection of different styles of bike-racks to choose from. The right rack should fit a vehicle properly without damage to either the vehicle or the bicycle, it should enable transporting the number of bicycles the user seeks to move, it should provide security for the bicycle or bicycles against being stolen or damaged, and the transported bicycle(s) should not extend from the automobile in a manner that endangers those nearby. Other factors may include the desire to either remove the bike rack from a vehicle while mounting it to another vehicle. Numerous other factors come into play such as the existence of utility racks, tow hitches, spare tires, fenders, and other automobile protrusions.

Conventional automobile-supported bike racks are often only configured for use with one (1) or two (2) bikes. This can be very frustrating if an individual is seeking to transport a larger number of bikes. Therefore, there is a need in the prior art for a vehicle mounted bike rack that is configured to support a large number of bicycles without damage to either the vehicle or to the bicycle(s). Preferably such a bicycle rack would be easy to install, strong and sturdy, manufacturable at low cost, protective of both the bicycle(s) and the vehicle, easy to use, adaptable to multiple needs and suitable for use with multiple vehicles having protrusions such as bumpers, luggage racks, exterior mounted tires and other protrusions.

SUMMARY OF THE INVENTION

The principles of the present invention provide for a vehicle mounted bike rack that is can be configured to support a large number of bicycles without damage to either the vehicle or to the bicycle(s). That bicycle rack is easy to install, strong and sturdy, manufacturable at low cost, protective of both the bicycle(s) and the vehicle, easy to use, adaptable to multiple needs and suitable for use with multiple vehicles having protrusions such as bumpers, luggage racks, exterior mounted tires and other protrusions.

A vehicle bicycle rack in accord with the present invention includes a hitch assembly, a vertical support frame vertically extending from said hitch assembly, a lower support frame extending horizontally from said vertical support frame, and an upper support frame extending horizontally from the top of said vertical support frame.

The hitch assembly may include a hitch frame and a pivot bracket that is attached to said hitch frame at its distal end. The pivot bracket then receives said vertical support frame. The pivot bracket includes a pivot bracket opening and the vertical support frame is mounted to said hitch assembly via a pivot connector such that the vertical support frame can pivot on said pivot connector from vertical toward horizontal. A hitch assembly gusset member that reinforces the connection between the vertical support frame and pivot bracket may be included. Hitch frame apertures in the hitch frame can be included to enable a user-determined spacing between a vehicle hitch and the vertical support frame. Also, lock apertures disposed along lateral faces of the pivot bracket may be included. Those lock apertures align with vertical support frame apertures that pass through the vertical support frame. Then, a locking pin can pass through the lock apertures and through the vertical support frame apertures.

A vertical support frame projection may be attached between the top of said vertical support frame and the upper support frame. A projection gusset member can then be attached to the vertical support frame projection and to said vertical support frame for reinforcing the connection therebetween. The upper support frame may include an upper support frame connector that connects the upper support frame to the vertical support frame projection. In that case the upper support frame connector may include upper connector apertures, the vertical support frame projection may include apertures that align with the upper connector apertures, and a connector fastener can pass through the upper connector apertures and through the vertical support frame apertures.

The vertical support frame beneficially includes a plurality of center apertures that are disposed between said hitch frame and said vertical support frame projection. The lower support frame beneficially includes at least one (1) clevis having clevis apertures that align with a selected pair of plurality of center apertures. Then, a lower support frame fastener can pass through the clevis apertures and through the selected pair of plurality of center apertures to attach the lower support frame to the vertical support frame.

The lower support frame includes a plurality of lower cradle members, each having a lower cradle pin affixed thereto, and a lower cradle strap having distal ends removably connected to distal ends of the lower cradle pin.

The upper support frame includes a plurality of first upper cradle members, each having a first lower cradle pin affixed thereto, and a first lower cradle strap having distal ends removably connected to distal ends of the first lower cradle pin, and a plurality of second upper cradle members, each having a second lower cradle pin affixed thereto, and a second lower cradle strap having distal ends removably connected to distal ends of the second lower cradle pin. Each first upper cradle member further includes a lower angle iron affixed to an upper surface of the upper support member, and an upper angle iron, having a first end affixed to a first end of the lower angle iron and extending away upwardly therefrom at an angle. Each second upper cradle member further includes a lower angle iron affixed to an upper surface of the upper support member, a first upper angle iron having a first end affixed to a first end of the lower angle iron and extending away upwardly therefrom at a first angle, and a second upper angle iron having a first end affixed to a second end of the lower angle iron and extending away upwardly therefrom at a second angle.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
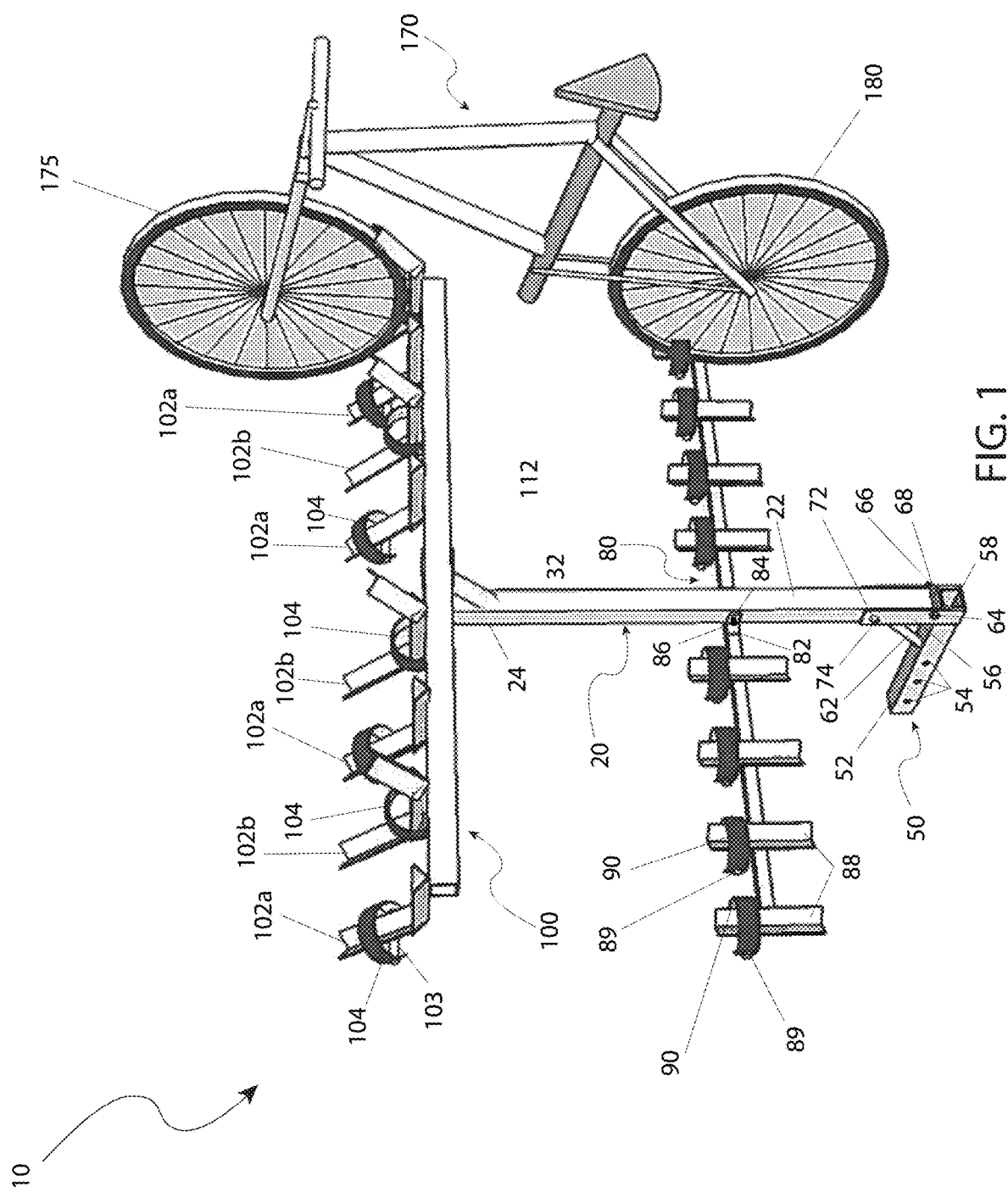
FIG. 1 is an environmental perspective view of a vehicle bicycle rack 10 that is in accord with the preferred embodiment of the present invention.

DESCRIPTIVE KEY 10 bicycle rack
20 vertical support frame
22 vertical support frame lower end
24 vertical support frame upper end
26 vertical support frame projection
28 projection aperture
32 projection gusset member
34 vertical support frame pivot aperture
36 vertical support frame lock aperture
38 vertical support frame center aperture
50 hitch assembly
52 hitch frame
54 hitch frame aperture
56 pivot bracket
58 pivot bracket opening
62 hitch assembly gusset member
64 pivot aperture
66 pivot pin
68 pivot pin fastener
72 lock aperture
74 lock pin
76 lock pin fastener
80 lower support frame
82 clevis
84 clevis aperture
86 lower support frame fastener
88 lower cradle
89 lower cradle strap pin
90 lower cradle strap
100 upper support frame
102a first upper cradle
102b second upper cradle
103 upper cradle strap pin
104 upper cradle strap
105 upper support frame connector
106 connector aperture
108 connector fastener
170 bicycle
175 front wheel
180 rear wheel

DETAILED DESCRIPTION OF THE PREFERRED EMBODIMENT

The preferred embodiment of the present invention is depicted in FIGS. 1 through 5. However, the present invention is not limited to the specifically described embodiment. A person skilled in the art will appreciate that many other embodiments of the invention are possible without deviating from the basic concept of the invention. Any such work around also falls under the scope of this invention.

In the FIGS. like numbers refer to like elements throughout. Additionally, the terms "a" and "an" as used herein do not denote a limitation of quantity but rather denote the presence of at least one (1) of the referenced items.

The present invention describes a vehicle bicycle rack 10 which provides a means to attach one (1) or more bicycles 170 (see FIG. 4) to the receiver of a standard hitch 155 (see FIG. 3) to conveniently transporting that (those) bicycle(s) 170 to some destination.

Figure 2:
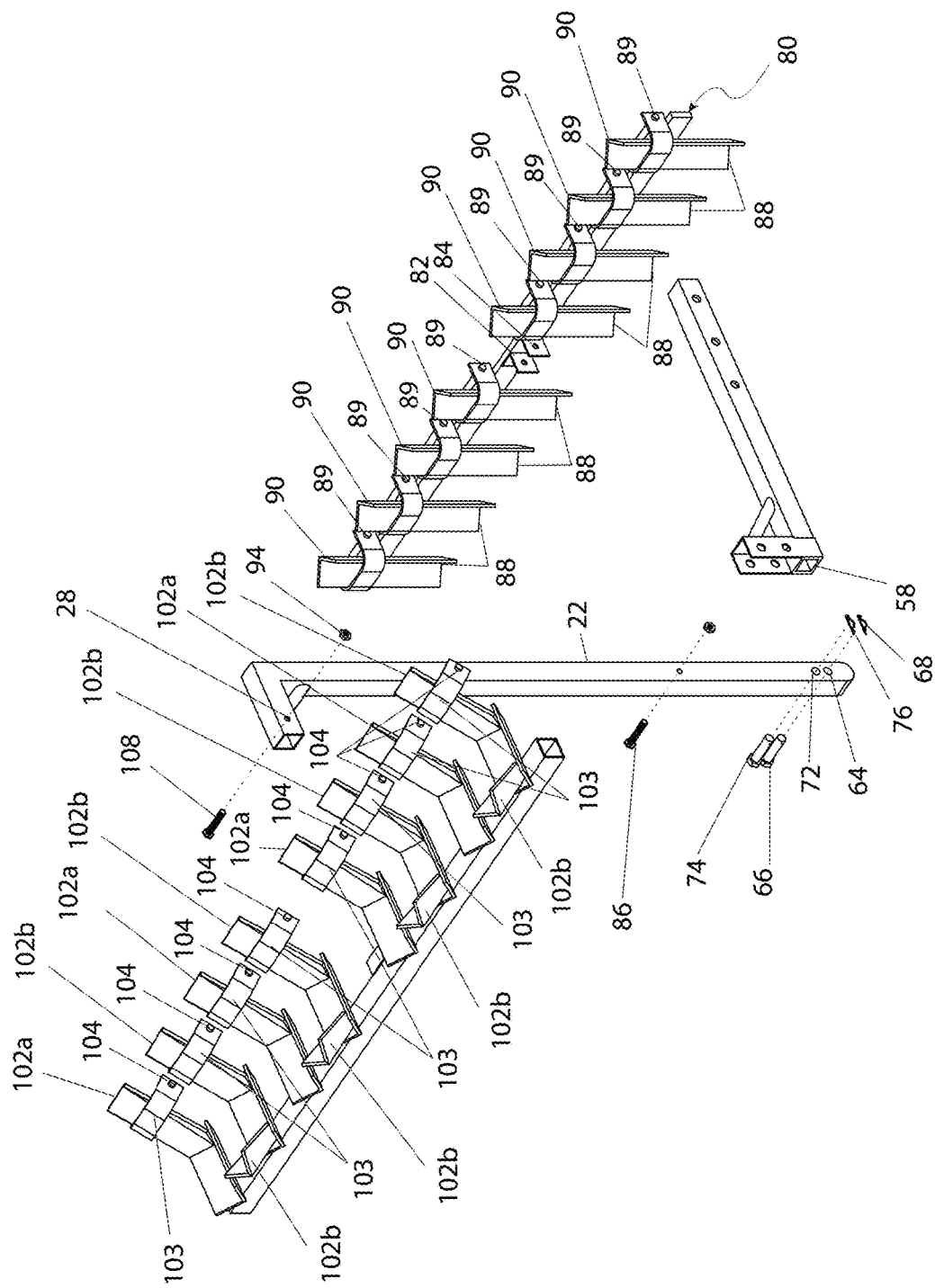
FIG. 2 is an exploded front perspective view of a vehicle bicycle rack 10 that is in accord with the preferred embodiment of the present invention.
Figure 3:
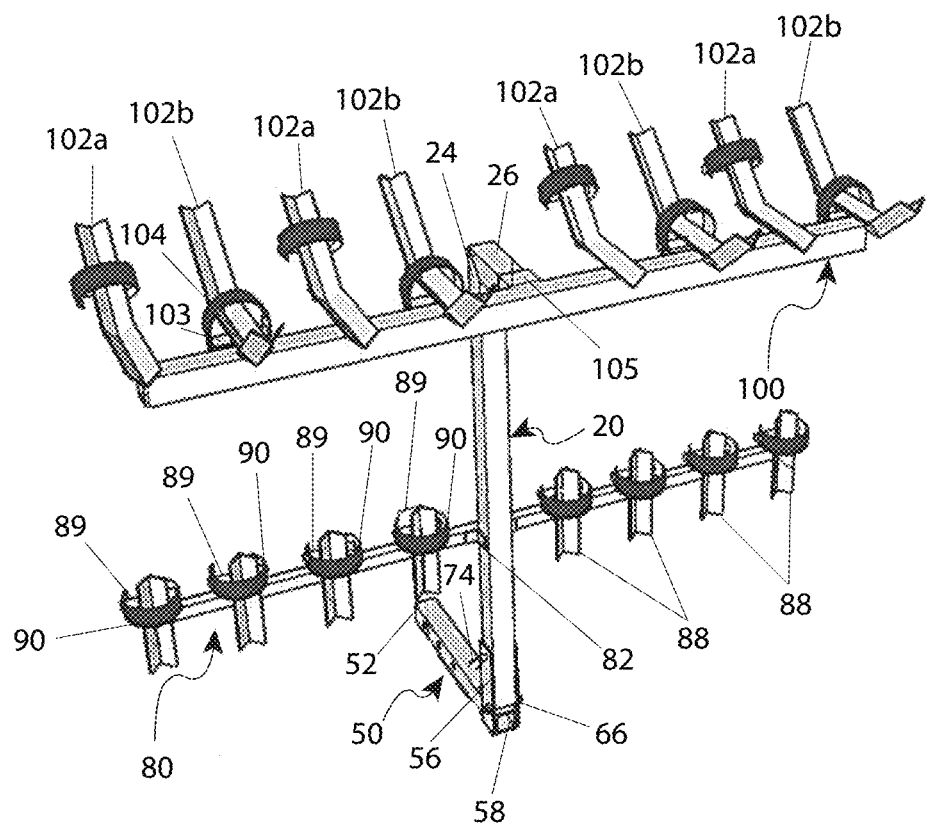
FIG. 3 is another top front perspective view of a vehicle bicycle rack 10 that is in accord with the preferred embodiment of the present invention; and, FIG. 4 is a rear perspective view of a vehicle bicycle rack 10 that is in accord with the preferred embodiment of the present invention.

Refer now to FIG. 1 for a perspective view and to FIG. 2 for an exploded view of a bicycle rack 10 that is in accord with the preferred embodiment of the present invention. The bicycle rack 10 includes a hitch assembly 50, a vertical support frame 20, a lower support frame 80, and an upper support frame 100. Each of the previously mentioned components 20, 50, 80, and 100 are preferably painted or plated or otherwise protected to inhibit deterioration.

The hitch assembly 50 includes a hitch frame 52 comprised of square structural steel tubing and a pivot bracket 56 attached to the distal end of the hitch frame 52 preferably by welding. It should be understood that other materials or other structural shapes may be used in other embodiments. The pivot bracket 56 is beneficially a three-sided rectangular structural having a pivot bracket opening 58 at its distal face. The pivot bracket 56 enables vertical reception of the vertical support frame 20 onto the hitch assembly 50 while the pivot bracket opening 58 enables the vertical support frame 20 to pivot from vertical toward the horizontal (see FIG. 3). A preferred height of the pivot bracket 56 is eight-and-a-half inches (8-in.).

A hitch assembly gusset member 62 is attached, preferably by welding, to the upper face of the hitch frame 52 and to the proximal face of the pivot bracket 56. Preferably that connection is at approximately a forty-five degree (45°) angle. The hitch assembly gusset member 62 reinforces the connection between the hitch frame 52 and the pivot bracket 56 to provide much greater physical strength and to provide resistance to vibration and other motions.

Figure 4:
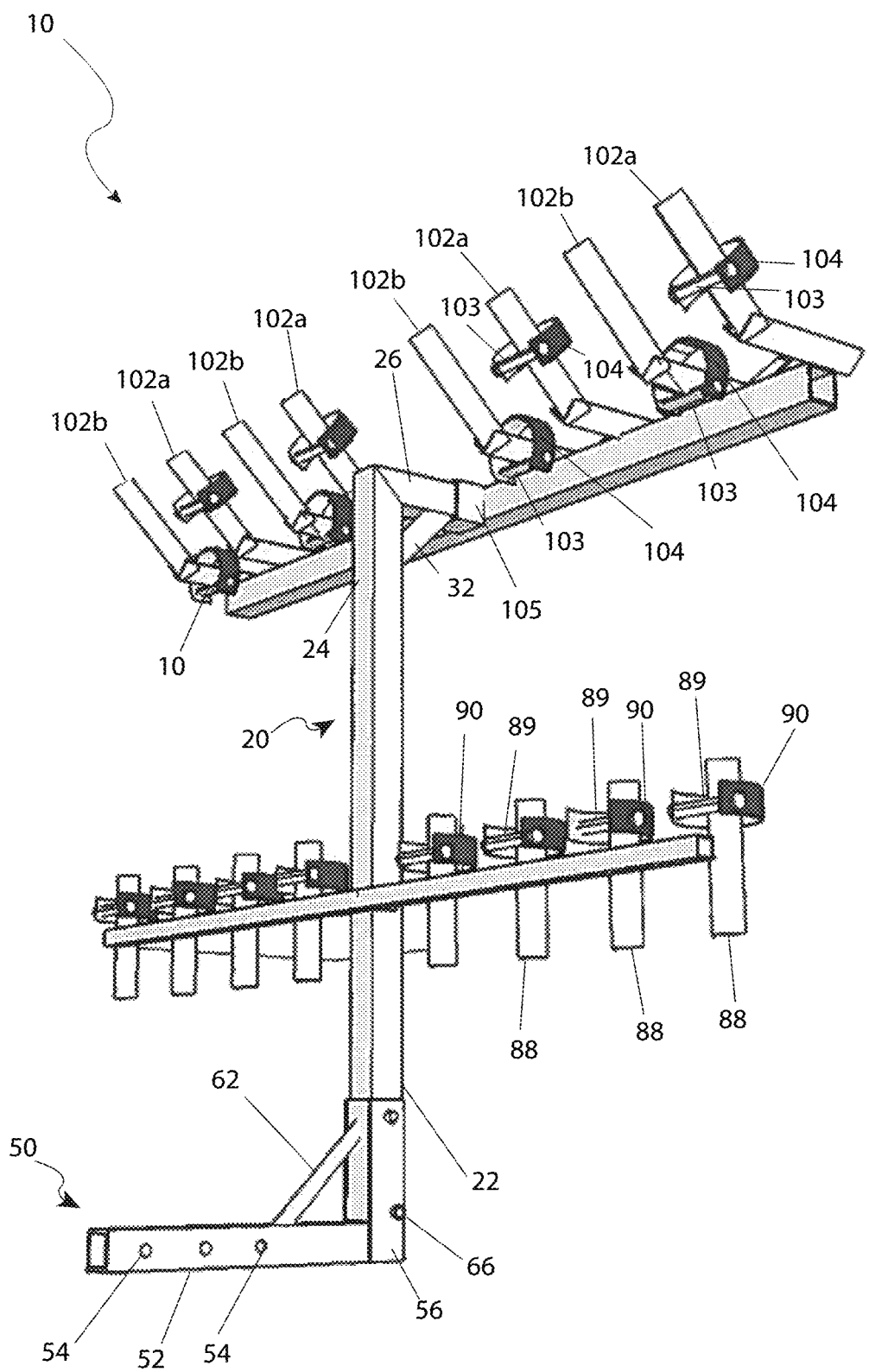

Referring now to FIGS. 1, 2 and 4, illustrate a plurality of aligned hitch frame apertures 54 that are disposed along the vertical faces of the hitch frame 52. These hitch frame apertures 54 allow a user-determined spacing between the hitch 155 and the vertical support frame 20 to enable clearing any projections from the rear of a vehicle such as a spare tire or the like. A standard hitch pin (not shown) is placed in the hitch and through one (1) set of the aligned hitch frame apertures 54 to secure the hitch assembly 50 to the vehicle. The hitch pin may be any of a variety of devices capable of accomplishing the intended function and therefore imposes no limitation upon the scope of the bicycle rack 10. Preferably, the length between the centerline of the rearmost hitch aperture 54 and the terminal end of the hitch frame 52 is eighteen inches (18 in.).

As shown in FIG. 2, aligned, pivot apertures 64 are disposed along the lower portion of the lateral faces of the pivot bracket 56. Likewise, aligned lock apertures 72 are disposed along the upper portion of the lateral faces of the pivot bracket 56. The purpose of these apertures 64, 72 is discussed subsequently.

Referring now to FIGS. 1 and 2, the vertical support frame 20 is preferably a square structural steel tube having a vertical support frame lower end 22 and a vertical support frame projection 26 at a vertical support frame upper end 24. The vertical support frame projection 26 is oriented such that is projects away from a rear face of the vertical support frame upper end 24 (i.e. rearwardly) and opposite from the hitch assembly 50. The cross-sectional profile of the vertical support frame 20 is such that a slip fit within the pivot bracket 56 exists. A pair of aligned, vertical support frame pivot apertures 34 are disposed through lateral faces near the bottom of the vertical support frame lower end 22. A pair of aligned vertical support frame lock apertures 36 are disposed through the lateral faces of the vertical support frame 20 approximately five-and-one-eighth inches (5¼ in.) above the vertical support frame pivot apertures 34.

In use, the vertical support frame 20 is inserted into the pivot bracket 56 through the pivot bracket opening 58 with the vertical support frame pivot apertures 34 aligned with the pivot apertures 64. A pivot pin 66 is then inserted into the aligned apertures 34, 64 and secured therein with a pivot pin fastener 68. The pivot pin 66 is preferably a common bolt or cap-screw of sufficient girth and length to accomplish the intended pivot function between the components 20, 56. The pivot pin fastener 68 is an appropriately sized nut and lock washer. Other components, such as a headed pin and any suitable locking device such as a cotter pin or a snap ring alternatively may be utilized without limiting the scope of the bicycle rack 10. A preferred height of the vertical support frame 20, as measured from the terminal end of the vertical frame upper end 24 and the centerline of the position of the pivot apertures 64 is forty-two and one-sixteenth inches (42¹⁄₁₆ in.).

With the vertical support frame lower end 22 secured within the pivot bracket 56, the vertical support frame lock apertures 36 are brought into alignment with the lock apertures 72 of the pivot bracket 56. A lock pin 74 is then inserted through those apertures 36, 72 and secured using a lock pin fastener 76. The lock pin 74 is preferably a commercially available headed pin. The lock pin fastener 76 is preferably a commercially available spring pin of an appropriate size to be easily inserted onto an aperture (not shown) of the lock pin 76. It is understood that other components, such as any specialized headed pin and fastener may be utilized without limiting the scope of the bicycle rack 10. With the pivot pin 66 and the lock pin 74 inserted as described the vertical support frame 20 is vertically connected to the hitch assembly 50.

As noted the vertical support frame projection 26 is attached to the vertical support frame upper end 24. The mating ends of the vertical support frame 20 and the vertical support frame projection 26 are preferable cut along a forty-five degree (45°) angle and then welded together. A projection gusset member 32 is then welded to the lower face of the vertical support frame projection 26 and to the rear face of the vertical support frame 20 at approximately a forty-five degree (45°) angle. The projection gusset member 32 reinforces the joint between the vertical support frame 20 and the vertical support frame projection 26. An aligned, circular pair of projection apertures 28 are disposed along the lateral faces of the vertical support frame projection 26 at its distal end. The purpose of the projection apertures 28 is to secure the second support frame 100 to the vertical support frame 20 as is discussed subsequently.

As best shown in FIG. 2, aligned vertical support frame center apertures 38 are disposed along the lateral faces of the vertical support frame 20 approximate twenty inches (20 in.) above the vertical support frame lower end 22. The vertical support frame center apertures 38 are utilized in pairs for the attachment of the lower support frame 80. The location of the lower support frame 80 along the vertical support frame 20 is dictated by the wheelbase(s) of the bicycle(s) 170, or the majority thereof to be supported upon the bicycle rack 10.

The lower support frame 80 is preferably a square structural steel tube. However, other materials and configurations can be used. A preferred length of the lower support frame 80 is fifty-five inches (55 in.). A pair of angle pieces is disposed along the midpoint of the lower support frame 80 to form a clevis 82. The clevis 82 is used in conjunction with a lower support frame fastener 86 to attach the lower support frame 80 to the vertical support frame 20 at the desired location. To that end, a clevis aperture 84 is provided in each clevis 82 for receiving the lower support frame fastener 86. The clevis apertures 84 are then aligned with a desired pair of center apertures 38 and then the lower support frame fastener 86 is passed through the clevis apertures 84 and the desired center apertures 38. The lower support frame fastener 86 is secured with a nut 92 of the appropriate size.

Equidistantly spaced along the length of the lower support frame 80, on either side of a bisecting axial centerline, are a plurality of lower cradles 88. Each lower cradle 88 is preferably an angle iron. The lower cradle 88 is welded or otherwise affixed to the rear face of the lower support frame 80 and oriented vertically such that the open portion of the lower cradle 88 faces the same way (i.e. rearwardly) as the vertical support frame projection 26. It is appreciated that each lower cradle 88 is mounted such that a centerpoint is aligned with a bisecting longitudinal centerline of the lower support frame 80. Affixed to a forward side (i.e. towards the hitch assembly 50) of each lower cradle 88, and above the lower support frame 80, is a lower cradle strap pin 89 and oriented horizontal, generally parallel with the lower support frame 80. A lower cradle strap 90 is removably attached at both ends to distal ends of the lower cradle strap pin 89. The width of the open portion of the lower cradle 88 is sized to enable cradling of a portion of either tire 175, 180 of the bicycle 170, and the lower cradle strap 90 can be routed around the rim of the tire 175, 180 and secured to the lower cradle strap pin 89, thereby securing the tire 175, 180 to the lower cradle 88, and hence the lower support frame 80. Preferably, each lower cradle 88 is approximately eight inches (8 in.) in length.

Referring primarily to FIGS. 1 and 2, also illustrated is an upper support frame 100, which is preferably a square structural steel tube, having an upper support frame connector 105 centrally disposed along the front face of the upper support frame 100. A preferred length of the upper support frame 100 is also fifty-five inches (55 in.). The upper support frame connector 105 is beneficially a section of square structural steel tubing sized to receive the end of the vertical support frame projection 26. A pair of aligned circular connector apertures 106 is disposed centrally through the support frame connector 104. In use, the support frame connector 105 receives the vertical support frame projection 26. When the connector apertures 106 align with the projection apertures 28 a connector fastener 108 is inserted through the connector apertures 106 and through the aligned projection apertures 28. The connector fastener 108 is then secured in place using an appropriately sized nut 94. This fastens the upper support frame 100 to the vertical support frame 20. A preferred length of the combined vertical support frame projection 26 and upper support frame connector 105 is eight inches (8 in.).

Equidistantly spaced along the length of the upper support frame 100, on either side of a bisecting axial centerline, are a plurality of upper cradles 102a, 102b. Such an equidistant spacing can be seven inches (7 in.), The distance between adjacent ones of the upper cradles 102a, 102b to the upper support frame connector can be six-and-a-half inches (6½ in.). Each upper cradle 102a, 102b is preferably an assembled structure fabricated out of angle iron. Each upper cradle 102a, 102b is welded or otherwise affixed to the upper face of the upper support frame 100 and oriented such that the open portion of the upper cradle 102a, 102b faces the same way (i.e. rearwardly) as the vertical support frame projection 26. It is appreciated that each upper cradle 102a, 102b is mounted such that a centerpoint is aligned with a bisecting longitudinal centerline of the upper support frame 100. In a preferred embodiment, the first upper cradle 102a and second upper cradle 102b are staggered such that a second upper cradle 102 is bracketed between a pair of first upper cradles 102a, and vice versa.

The first upper cradle 102a is fashioned as a pair of angle irons. A lower angle iron is affixed to the upper face of the upper support arm 100. An upper angle iron is welded to the front end (i.e. towards the same side as the hitch assembly 50) of the lower angle iron and projecting upwardly away therefrom at an angle. In a preferred embodiment, the length of the upper angle iron and the lower angle iron of each first upper cradle 102a is eight inches (8 in.). The second upper cradle 102b is fashioned as a set of three (3) angle irons. A lower angle iron is affixed to the upper face of the upper support arm 100, similar as the lower angle iron of the first upper cradle 102b and oriented parallel therewith. A first upper angle iron is affixed to a front end of the lower angle iron (i.e. towards the same side as the hitch assembly 50) and projecting upward at an angle and a second upper angle iron is affixed to a rear end (i.e. towards the opposite side of the apparatus 10 from the hitch assembly 50) of the lower angle iron and projecting upwardly at another angle. In a preferred embodiment, the length of the first upper angle iron and the lower angle iron of each first upper cradle 102a is eight inches (8 in.), whereas the length of the second upper angle iron is smaller.

Affixed to a bottom of each upper angle iron of each first upper cradle 102a (i.e., toward the hitch assembly 50), and above the upper support frame 100, is an upper cradle strap pin 103 and oriented horizontal, generally parallel with the upper support frame 100. Affixed to a bottom of each first angle iron of each second upper cradle 102b (i.e., toward the hitch assembly 50), and forward of the upper support frame 100 (i.e., toward the hitch assembly 50), is an upper cradle strap pin 103 and oriented horizontal, generally parallel with the upper support frame 100. An upper cradle strap 104 is removably attached at both ends to distal ends of the upper cradle strap pin 103. The width of the open portion of the upper cradles 102a, 102b are sized to enable cradling of a portion of either tire 175, 180 of the bicycle 170, and the upper cradle strap 104 can be routed around the rim of the tire 175, 180 and secured to the upper cradle strap pin 103, thereby securing the tire 175, 180 to the upper cradle 102a, 102b, and hence the upper support frame 100.

It is appreciated that an individual lower cradle 88 is vertically aligned with an individual first upper cradle 102a, or second lower cradle 102b, in order to vertically support and secure bicycles 170 on the apparatus 10.

The vertical support frame lower end 22 remains connected to the pivot bracket 56. To lower the vertical support frame 20, the bicycles 170 suspended from the bicycle rack 10 should be removed. The lock pin fastener 76 and the lock pin 74 would then be removed while laterally stabilizing the vertical support frame 20. The vertical support frame 20 can then pivot downward about the pivot pin 66 toward horizontal. This procedure allow access to the rear or rear compartments of the vehicle. After the apparatus 10 has been attached to the vehicle, a bicycle 170 would be lifted and its front wheel 175 would be placed onto a desired upper cradle 102a, 102b of the upper support frame 100, which is positioned along the upper support frame 100 as close as practical to the vertical support frame 20 for balancing purposes. The lower support frame 80 would then be vertically positioned along the vertical support frame 20 such that the rear wheel 180 of the bicycle 170 would be supported thereon.

If a second bicycle 170 is to be placed onto the bicycle rack 10, that second bicycle 170 should be installed on a desired upper cradle 102a, 102b in a position along the upper support frame 100 on the opposite side of the vertical support frame 20. The rear wheel 180 of the second bicycle 170 would then be placed upon the lower support frame 100 so that the second bicycle 170 is inverted relative to the first bicycle 170. Any subsequent bicycle 170, up to the maximum capacity of the bicycle rack 10 could then be placed on alternating sides of the vertical support frame 20 in an inverse position relative to its neighbor bicycle 170. When the final bicycle 170 has been placed upon the bicycle rack 10 and correctly positioned, the upper cradle straps 104 can support the respective wheel 175, 180 of the bicycle 170 in the particular upper cradle 102a, 102b and secured with the upper cradle pin 103 and similarly, the upper cradle straps 90 can support the respective wheel 175, 180 of the bicycle 170 in the particular lower cradle 88 and secured with the lower cradle pin 89. These methods ensure that can the bicycle(s) 170 are stabilized on the rack 10.

The preferred embodiment of the present invention can be utilized by an enabled individual in a simple and straightforward manner with little or no training. After initial purchase or acquisition of the bicycle rack 10 it would be installed as indicated in FIGS. 1 and 4. The method of installing and utilizing the bicycle rack 10 may be achieved by: acquiring a model of the bicycle rack 10; installing the hitch assembly 50 into an automobile hitch, inserting a user-supplied hitch pin (not shown) into the appropriate pair of aligned hitch frame apertures 54 so as to allow the desired clearance for the bicycle rack 10; fitting the vertical support frame lower end 22 into the pivot bracket 56 as previously described; pivoting the vertical support frame 20 to a vertical position; inserting the lock pin 74 and the lock pin fastener 76 as previously described; installing the upper support frame 100 as previously described; installing the lower support frame 80 according to the proscribed height as previously described; installing a bicycle 170 or a desired number of bicycles 170 up to the maximum capacity of the bicycle rack 10, as previously described; securing the bicycles 170 onto an aligned pair of upper cradle 102a, 102, or lower cradle 88; transporting the bicycles 170 to the desired location; removing the bicycles 170 from the apparatus 10; and enjoying a cycling adventure.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A vehicle bicycle rack, comprising:
 a hitch assembly;
 a vertical support frame vertically extending from said hitch assembly;
 a lower support frame extending horizontally from said vertical support frame; and,
 an upper support frame extending horizontally from a top of said vertical support frame, said lower support frame and said upper support frame are parallel to each other to provide better support to a bicycle secured by said vehicle bicycle rack;
 wherein said hitch assembly includes a hitch frame and a pivot bracket that is attached to said hitch frame at its distal end, and wherein said pivot bracket receives said vertical support frame;
 wherein said pivot bracket includes a pivot bracket opening, wherein said vertical support frame is mounted to said hitch assembly via a pivot connector, and wherein said vertical support frame can pivot on said pivot connector from vertical toward horizontal;
 further including a hitch assembly gusset member that reinforces a connection between said vertical support frame and said pivot bracket;
 further including a plurality of lock apertures disposed along lateral faces of said pivot bracket, aligned vertical support frame apertures that pass through said vertical support frame, and a locking pin passing through said lock apertures and through said vertical support frame apertures;
 wherein said vertical support frame and said hitch frame are rectangular sections of structural steel;
 wherein said vertical support frame includes a plurality of center apertures disposed between said hitch frame and said vertical support frame projection; and
 wherein said lower support frame further includes a plurality of lower cradle members, each having a lower cradle pin affixed thereto, and a lower cradle strap having distal ends removably connected to distal ends of said lower cradle pin.

2. The vehicle bicycle rack according to claim 1, further including hitch frame apertures in said hitch frame to enable a user-determined spacing between a vehicle hitch and said vertical support frame.

3. The vehicle bicycle rack according to claim 1, further including a vertical support frame projection attached between the top of said vertical support frame and a second support frame.

4. The vehicle bicycle rack according to claim 3, further including a projection gusset member attached to said vertical support frame projection and to said vertical support frame for reinforcing a connection there between.

5. The vehicle bicycle rack according to claim 1, wherein said lower support frame includes at least one clevis, each having clevis apertures that align with a selected pair of said plurality of center apertures.

6. The vehicle bicycle rack according to claim 5, further including a lower support frame fastener that passes through said clevis apertures and through said selected pair of said plurality of center apertures to attach said lower support frame to said vertical support frame.

7. The vehicle bicycle rack of claim 1, wherein said lower cradle members comprise an angle iron, each oriented vertically on said lower support frame.

8. The vehicle bicycle rack according to claim 1, wherein said upper support frame includes an upper support frame connector that connects said upper support frame to said vertical support frame projection.

9. The vehicle bicycle rack according to claim 8, wherein said upper support frame connector includes upper connector apertures, said vertical support frame projection includes apertures that align with said upper connector apertures, and a connector fastener that passes through said upper connector apertures and through said vertical support frame apertures.

10. The vehicle bicycle rack of claim 1, wherein said upper support frame further comprises:
 a plurality of first upper cradle members, each having a first lower cradle pin affixed thereto, and a first lower cradle strap having distal ends removably connected to distal ends of said first lower cradle pin; and,
 a plurality of second upper cradle members, each having a second lower cradle pin affixed thereto, and a second lower cradle strap having distal ends removably connected to distal ends of said second lower cradle pin.

11. The vehicle bicycle rack of claim 10, wherein each first upper cradle member further comprises:
 a lower angle iron, affixed to an upper surface of said upper support member; and,
 an upper angle iron, having a first end affixed to a first end of said lower angle iron and extending away upwardly therefrom at an angle.

12. The vehicle bicycle rack of claim 10, wherein each second upper cradle member further comprises:
 a lower angle iron, affixed to an upper surface of said upper support member;
 a first upper angle iron, having a first end affixed to a first end of said lower angle iron and extending away upwardly therefrom at a first angle; and,
 a second upper angle iron, having a first end affixed to a second end of said lower angle iron and extending away upwardly therefrom at a second angle.

13. The vehicle bicycle rack according to claim 1, wherein said vertical support frame, said lower support frame, and said upper support frame include a protective coating.

\* \* \* \* \*